United States Patent [19]
Pedersen

[11] 3,971,693
[45] July 27, 1976

[54] PROCESS AND APPARATUS FOR JOINING OBJECTS TOGETHER

[76] Inventor: Ib Obel Pedersen, Lerhoj 7, 2880 Bagsvaerd, Denmark

[22] Filed: Jan. 22, 1973

[21] Appl. No.: 325,236

[30] Foreign Application Priority Data

Jan. 20, 1972 Denmark .............................. 283/72

[52] U.S. Cl. ............................ 156/273; 144/281 C; 156/323; 156/380; 219/10.53; 219/10.81

[51] Int. Cl.² ...................... B29C 27/00; H05B 7/06

[58] Field of Search ........... 156/273, 272, 380, 580, 156/274, 98, 323; 144/281 C, 281 R, 317, 313; 219/10.81, 10.53

[56] References Cited

UNITED STATES PATENTS

| | | | |
|---|---|---|---|
| 2,434,573 | 1/1948 | Mann et al. | 156/273 |
| 2,463,054 | 3/1949 | Quayle et al. | 156/273 |
| 2,526,342 | 10/1950 | Frisch | 144/281 C |
| 2,625,969 | 1/1953 | Mann | 144/281 C |
| 2,667,437 | 1/1954 | Zoubek | 156/380 |
| 2,783,344 | 2/1957 | Warren | 219/10.81 |
| 2,922,865 | 1/1960 | Schattler et al. | 156/380 |
| 2,936,816 | 5/1960 | Lang | 156/273 |
| 2,969,327 | 1/1961 | Quehl, Jr. | 156/380 |
| 3,046,181 | 7/1962 | Mann et al. | 156/274 |
| 3,232,810 | 2/1966 | Reesen | 156/273 |
| 3,232,811 | 2/1966 | Coulter et al. | 156/273 |
| 3,281,566 | 10/1966 | Zelnick | 219/10.53 |

*Primary Examiner*—William A. Powell
*Assistant Examiner*—M. G. Wityshyn

[57] ABSTRACT

A process for joining objects, such as wooden boards, by means of a cement adapted to be hardened in an electric high-frequency field between a pair of electrodes, wherein the section of the objects situated between the electrodes is sealed off by means of a suitable layer of resilient material pressed against the surfaces of the objects to prevent steam and ionized gases from escaping from the objects to the surrounding space, thereby permitting a substantial increase of the electric energy applied without risk of spark discharge between the electrodes. The invention also provides a device for performing this process, comprising a pair of electrodes provided with a layer of such resilient material.

3 Claims, 4 Drawing Figures

PROCESS AND APPARATUS FOR JOINING OBJECTS TOGETHER

Figure 1:
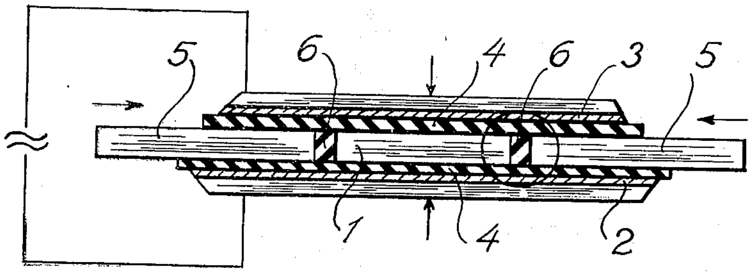

This invention relates to a process for joining objects together by means of a cement adapted to be hardened through the action of an electric high-frequency field between a pair of electrodes applied to preferably opposite faces of the joined objects. The invention is particularly, though not exclusively, concerned with the joining of wooden boards end to end by means of a socalled finger joint, i.e. a joint in which the ends of the boards to be joined are formed with alternate projections and recesses engaging each other finger-like. The invention will, therefore, hereinafter be described with a special view to this utilisation thereof, however without being limited thereto.

When two boards are to be cemented together end to end, or side by side, they are placed with their joint between opposed electrodes to which a high frequency source supplies an amount of electric energy capable of producing such an amount of heat in the joint that the cement becomes hardened. The higher the level of the energy supplied is, the sooner the cement is hardened. On the other hand, the amount of energy supplied to the electrodes must not be so high as to result in a spark discharge between the electrodes, which might be detrimental both to the wood and to the cement. For this reason, it has heretofore not been possible to reduce the hardening time of the cement to less than about 20 seconds. This value applies, for example, to a much used cement of the resorcinol type.

It has been found that a primary cause of discharges between the electrodes is the generation of steam and ionised gases in consequence of the heat generated in the cement and in the wood under the action of the high-frequency field. Both the cement and the wood contain a certain amount of water which is, thus, caused to vaporise, thereby making the surrounding air better conductive and, consequently, increasing the risk of discharges.

The invention aims to provide a process of the kind referred to hereinbefore which will avoid this inconvenience and which, accordingly, allows a much higher energy level to be used, so that the hardening time of the cement is substantially reduced.

To this effect, the invention provides a process of the kind referred to, in which an intermediate layer of a steam-tight, resilient electrically insulating material is applied to at least those faces of the objects to which the electrodes are applied, the intermediate layer being pressed firmly against these faces, preferably by means of the electrodes. When these intermediate layers are pressed against the surfaces of the objects to be joined, they adapt themselves to the form of the surfaces and seal all pores and other openings, including the joint, towards the exterior. Accordingly, the steam generated under the action of the heating of the objects and of the cement cannot penetrate into the surrounding air to increase the conductivity thereof. In practice, it has been found that the level of the energy supplied through the electrodes may be increased to such an extent that the hardening time of the cement is reduced to about 3 seconds, or less.

The steam-tight resilient intermediate layer may consist of any suitable material, such as rubber or other elastomer substances. Its thickness depends, on the one hand, of the resiliency of the material and, on the other hand, of the surface properties of the objects to be joined. If the latter have a relatively rough surface, for example, the intermediate layer should be correspondingly thick and resilient in order to be capable of being pressed sealingly against the surfaces, while inversely objects having a relatively smooth surface, such as planed boards, will only require a correspondingly thinner and less resilient intermediant layer.

Preferably, the intermediate layer has such dimensions and is so arranged as to extend in all directions beyond the contour of the electrodes, whereby the potential discharge way becomes longer, and at the same time any steam issuing from the objects outside the faces covered by the intermediate layer is kept remote from the areas of high field intensity. Equally, also those faces of the objects which do not face the electrodes may be covered with a layer of steam-tight, resilient, electrically insulating material over a length corresponding at least to the extension of the electrodes in the direction of the faces in question. This measure is particularly recommendable when the electrodes are large enough to be used with all current dimensions of objects to be joined and, accordingly, in the case of objects of certain dimensions, such as boards having a relatively small width, will extend beyond the objects in one or more directions. In this case, the measure described will prevent steam and gas from issuing from the edge faces of the boards into the space between the protruding portions of the electrodes.

The invention also provides a device for performing the described process, and of the type having two or more electrodes adapted to be applied to faces of the objects to be joined, wherein the faces of the electrodes adapted to be applied to the objects are coated with a layer of steam-tight, resilient, electrically insulating material. Thus the intermediate layer of the invention constitutes part of the electrodes and is thus automatically applied to the objects to be joined when the electrodes are pressed against the same by pneumatic or hydraulic means, for example. These means should, of course, be capable of exerting a pressure which is greater than that with which the contained steam in the objects strives to remove the electrodes from the surfaces of the objects.

In a preferred form of the device intended for cementing transverse joints between oblong objects having a substantially rectangular cross-section, and having the electrodes arranged in parallel planes opposite each other to receive the objects between them, especially a device for joining wooden boards end to end, a pair of opposed slides are arranged for sliding movement towards and away from each other between the planes of the electrodes in a direction parallel with these planes, the opposed ends of the slides being provided with a coating consisting of a steam-tight, resilient, electrically insulating material, the coating having a dimension in a direction at right angles to the planes of the electrodes approximately equal to the distance between the electrodes when applied to the objects, and a dimension in a direction parallel with the planes of the electrodes and with the longitudinal direction of the objects substantially equal to the dimension of the electrode coatings in this direction.

Figure 2:
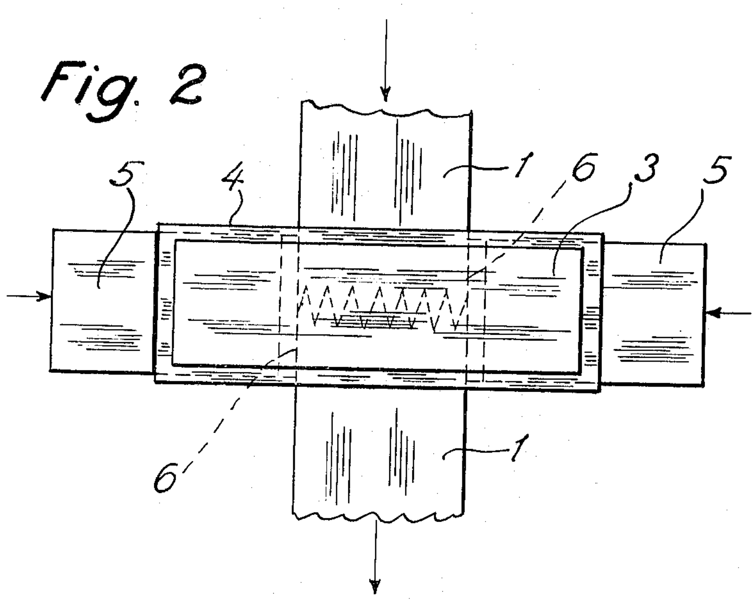
Figure 3:
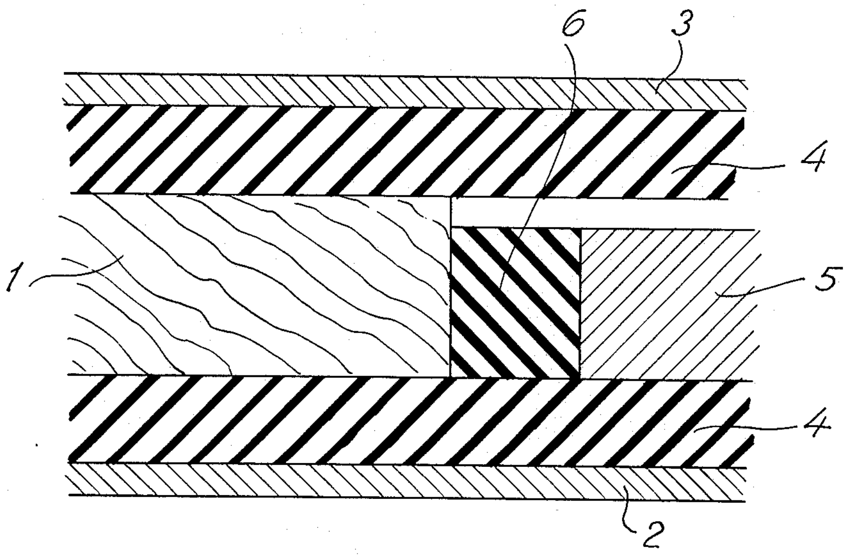
Figure 4:
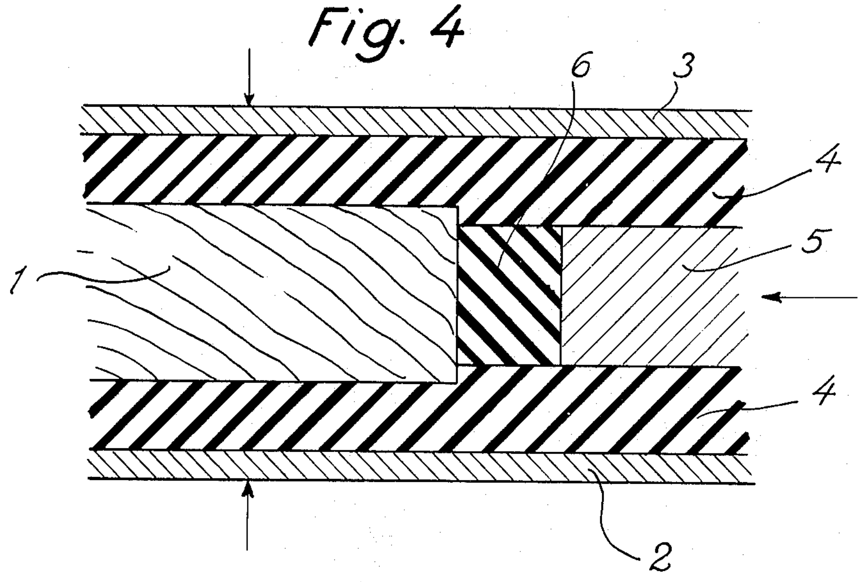

Reference will now be had to the accompanying drawings, in which:

FIG. 1 is a diagrammatical cross section of the essential parts of a device in accordance with the invention, FIG. 2 is a plan view of the same, and FIGS. 3 and 4 are large scale representations of the area surrounded by a circle in FIG. 1, showing the parts immediately before pressure is exerted to urge the upper electrode against the objects to be joined, and after the pressing down of the upper electrode, respectively.

The device illustrated in the drawings is intended for joining wooden boards end to end in a socalled finger joint. The end faces of the boards are, as shown in FIG. 2, formed with a plurality of substantially wedge-shaped notches with corresponding intermediate projections engaging the notches of the adjoining board, a suitable cement being previously applied to the interengaging faces. The device comprises a stationary lower electrode 2 mounted in a frame (not shown) and serving as a support for the adjoining ends of the boards, and a vertically adjustable upper electrode 3 which by some suitable means, such as a hydraulic or pneumatic cylinder, can be urged against the upper faces of the boards 1. Both electrodes have relatively large dimensions in the transverse direction of the boards, so as to be capable of use with various dimensions of boards. In the example shown, they extend a relatively great distance beyond the lateral edges of the boards, and likewise their dimensions in the longitudinal direction of the boards are substantially greater than the depths of the wedge-shaped notches of the end faces of the boards. The electrodes 2, 3 are connected to a HF, VHF, UHF or micro-wave generator (not shown) having a suitable power output. Each electrode is, on the face thereof opposite the other electrode, coated with a layer 4 of a steam-tight, resilient, electrically insulating material, such as rubber or soft plastic, this layer extending in all directions a certain distance beyond the contour of the electrode.

A pair of opposed slides 5 are mounted in the frame (not shown) for sliding movement towards and away from each other in such a manner that they can be introduced between the electrodes 2 and 3 to engage the lateral faces of the boards 1, as shown in FIG. 1. These slides which, like the electrode 3, are connected with a suitable prime mover, are provided with a steam-tight, resilient, electrically insulating coating 6 on their ends adapted to engage the boards. These coatings extend a distance in the longitudinal direction of the boards substantially equal to the dimension of the coatings 4 in this direction, while their heights (at right angles to the planes of the electrodes) are approximately equal to the thickness of the boards, or preferably somewhat smaller, as shown in FIG. 3.

In this latter case, the electrode coatings 4, when pressed against the upper and lower faces of the boards, will be deformed around the sharp edges of the board to meet the slide coatings 6, as shown in FIG. 4. In this manner, the faces of contact between the coatings 4 and 6, which constitute a potential leak for steam from the boards, are kept at a certain distance from the sharp edges of the boards, through which the steam would have a particular tendency to escape. Furthermore, this dimensioning of the slide coatings 6 enable the slides to be used with boards of various thicknesses within a certain range. In this connection, the slides 5 should be mounted with a certain vertical clearance in order to allow them to adjust themselves between the electrodes when the latter are pressed against the boards.

The manner of operation of the device described is as follows:

The boards to be cemented together are placed with their joint on the lower electrode 1, as shown in FIG. 2, and are at the same time urged longitudinally against each other by suitable means (not shown) which are well-known in the art. The slides 5 are caused to engage the lateral faces of the boards with a moderate pressure, and the upper electrode is lowered against the upper faces of the boards, see FIG. 3. Now full pressure is applied both to the slides and to the upper electrode, so that the entire section of the boards situated between the coatings 4 and 6 on both sides of the joint is enclosed in a steam-tight manner between the coatings. Subsequently, the electrodes are connected to the high-frequency generator for some seconds, until the cement has become hardened. During this hardening, the coatings 4, 6 prevent the steam generated from forcing its way out in the transverse directions of the boards, while at the same time the wood on both sides of the joint will offer a sufficient resistance to the leaking of steam from the joint in the longitudinal direction of the boards, at least for the short period of time required for hardening the cement. Accordingly, the hardening may be effected at a high-frequency power level which could heretofore not be utilised.

The invention is not limited to the example described hereinbefore and shown in the drawings. Thus, the process and the device in accordance with the invention may also be used for other operations than that of cementing boards together end to end, e.g. for cementing them together side by side or face to face, and with other forms of the joint, or for joining other materials than wood.

What I claim is:

1. A process for joining oblong objects having a rectangular cross-section together end to end by means of a cement adapted to be hardened through the action of an electric high-frequency field, said process comprising the steps of placing oblong objects end to end with their joint containing cement between a pair of opposed electrode plates adapted to generate a high-frequency field and with two of their faces parallel to said electrode plates, two other faces of said objects being at right angles thereto, applying a layer of a steam-tight, resilient, electrically insulating material to those areas of said faces parallel to and at right angles to said electrode plates situated within the space comprised between said electrode plates, pressing said layers firmly against said areas to prevent steam and gases from escaping therefrom, and supplying high-frequency electric energy to said electrodes to harden said cement.

2. A process as in claim 1, wherein said layers have such dimensions and are so arranged as to extend in the longitudinal direction of said oblong objects beyond the contours of said electrode plates.

3. A device for joining oblong objects of rectangular cross-section together end to end by means of a cement adapted to be hardened through the action of an electric high-frequency field, comprising a pair of opposed, parallel normally spaced electrode plates adapted to be forcibly applied to opposite parallel faces of said objects, said electrode plates being coated on their faces adapted to engage said opposite parallel faces of said objects with a layer of steam-tight, resilient, electrically insulating material, and a pair of opposed slides arranged for sliding movement towards and away from each other between said electrode plates in a direction parallel to said plates, said slides having opposed ends provided with a coating consisting of a steam-tight, resilient, electrically insulating material and adapted to engage another pair of opposed parallel faces of said oblong objects substantially over the width of said faces and along the length of the portions thereof disposed between said electrodes.

* * * * *